US011338793B2

(12) United States Patent
Komuro et al.

(10) Patent No.: US 11,338,793 B2
(45) Date of Patent: May 24, 2022

(54) VEHICLE CONTROL APPARATUS

(71) Applicant: SUBARU CORPORATION, Tokyo (JP)

(72) Inventors: Masaki Komuro, Tokyo (JP); Masahiro Ono, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 237 days.

(21) Appl. No.: 16/156,810

(22) Filed: Oct. 10, 2018

(65) Prior Publication Data

US 2019/0193717 A1 Jun. 27, 2019

(30) Foreign Application Priority Data

Dec. 26, 2017 (JP) ............................ JP2017-249380

(51) Int. Cl.
*B60W 20/16* (2016.01)
*B60W 20/40* (2016.01)
(Continued)

(52) U.S. Cl.
CPC ............ *B60W 20/16* (2016.01); *B60W 20/40* (2013.01); *F01N 11/007* (2013.01);
(Continued)

(58) Field of Classification Search
CPC ................ B60W 20/16; B60W 20/40; B60W 2520/105; B60W 2530/12;
(Continued)

(56) References Cited

U.S. PATENT DOCUMENTS 6,173,569 B1 * 1/2001 Kusada .................... B60K 6/24 180/65.235
2001/0037642 A1 * 11/2001 Uchida ................. B60W 10/06 60/277

(Continued)

FOREIGN PATENT DOCUMENTS

CN 102224329 A 10/2011
CN 103443431 A 12/2013

(Continued)

OTHER PUBLICATIONS

Japanese Notice of Reasons for Refusal issued in corresponding Japanese Patent Application No. 2017-249380, dated Jul. 23, 2019, with English translation.

(Continued)

*Primary Examiner* — Thomas E Worden
(74) *Attorney, Agent, or Firm* — McDermott Will & Emery LLP

(57) ABSTRACT

A vehicle control apparatus for a vehicle includes a catalyst deterioration diagnosing unit, an engine controlling unit, and a diagnosis start determining unit. The catalyst deterioration diagnosing unit executes a deterioration diagnosis of a catalyst included in an exhaust system of an engine provided in the vehicle. The engine controlling unit controls an air-fuel ratio of the engine to a lean side and thereafter to a rich side during the deterioration diagnosis of the catalyst. The diagnosis start determining unit prohibits the deterioration diagnosis of the catalyst from being executed when a deceleration rate upon deceleration of the vehicle is high, and permits the deterioration diagnosis of the catalyst to be executed when the deceleration rate upon deceleration of the vehicle is low.

8 Claims, 10 Drawing Sheets

(51) Int. Cl.
*F01N 11/00* (2006.01)
*F02D 41/30* (2006.01)

(52) U.S. Cl.
CPC ..... *F02D 41/3017* (2013.01); *F02D 41/3076* (2013.01); *B60W 2520/105* (2013.01); *B60W 2530/12* (2013.01); *B60W 2710/0622* (2013.01); *F01N 2430/06* (2013.01); *F01N 2550/02* (2013.01); *F01N 2590/11* (2013.01); *F01N 2900/08* (2013.01); *F01N 2900/10* (2013.01); *F01N 2900/1402* (2013.01); *F02D 2200/501* (2013.01)

(58) Field of Classification Search
CPC .......... B60W 2710/0622; F01N 11/007; F01N 2430/06; F01N 2550/02; F01N 2590/11; F01N 2900/08; F01N 2900/10; F01N 2900/1402; F02D 41/3017; F02D 41/3076; F02D 2200/501
See application file for complete search history.

(56) References Cited

U.S. PATENT DOCUMENTS

| | | | | |
|---|---|---|---|---|
| 2003/0070420 | A1* | 4/2003 | Uchida | F02D 41/1495 60/277 |
| 2008/0257325 | A1* | 10/2008 | Takubo | F02D 41/0295 123/672 |
| 2008/0302087 | A1* | 12/2008 | Genslak | F01N 9/00 60/277 |
| 2011/0232269 | A1 | 9/2011 | Inoue | |
| 2012/0130577 | A1* | 5/2012 | Ichimoto | B60W 20/13 903/930 |
| 2012/0253642 | A1 | 10/2012 | Kitano et al. | |
| 2014/0277998 | A1* | 9/2014 | Martin | F02D 41/123 701/102 |
| 2015/0076134 | A1 | 3/2015 | Sumilla et al. | |
| 2016/0138506 | A1* | 5/2016 | Miyamoto | F01N 11/007 60/276 |
| 2017/0298853 | A1* | 10/2017 | Kato | F02D 41/123 |
| 2018/0072307 | A1* | 3/2018 | Oguma | B60W 10/18 |
| 2018/0171898 | A1* | 6/2018 | Ulrey | F02B 25/145 |
| 2018/0347489 | A1* | 12/2018 | Inoshita | B01D 53/944 |
| 2019/0126908 | A1* | 5/2019 | Yokota | B60W 10/08 |
| 2019/0168735 | A1* | 6/2019 | Morisaki | B60W 10/26 |
| 2019/0193717 | A1* | 6/2019 | Komuro | F02D 41/0235 |

FOREIGN PATENT DOCUMENTS

| | | | |
|---|---|---|---|
| CN | 104454200 | A | 3/2015 |
| EP | 1 359 305 | A2 | 11/2003 |
| JP | 07-269330 | A | 10/1995 |
| JP | 11-36848 | A | 2/1999 |
| JP | 2000-199425 | A | 7/2000 |
| JP | 2000-328960 | A | 11/2000 |
| JP | 2003-120266 | A | 4/2003 |
| JP | 2008-267283 | A | 11/2008 |
| JP | 2012-117406 | A | 6/2012 |
| JP | 2013-083196 | A | 5/2013 |

OTHER PUBLICATIONS

Chinese Office Action issued in corresponding Chinese Patent Application No. 201811213342A, dated Aug. 19, 2021, with English translation.

* cited by examiner 11
12
13
14
15
15a
16
16a
17
18
18a
19
20
21
21a
22
23
24
30
31
32
33
34
35
36
37
38
39
40
41
42
42a
43
44
51
52
53
54
55
56
57
58

VEHICLE CONTROL APPARATUS

CROSS-REFERENCE TO RELATED APPLICATIONS

This application claims priority from Japanese Patent Application No. 2017-249380 filed on Dec. 26, 2017, the entire contents of which are hereby incorporated by reference.

BACKGROUND

The technology relates to a vehicle control apparatus to be applied to a vehicle provided with an exhaust system that includes a catalyst.

An engine exhaust system includes, for example, a catalyst that purifies an exhaust gas flowing in the exhaust system. In view of ensuring the performance of the catalyst of purifying the exhaust gas, a deterioration state of the catalyst has been required to be diagnosed periodically using, for example, an oxygen ($O_2$) sensor provided in the exhaust system. Reference is made to Japanese Unexamined Patent Application Publication No. 2000-199425, for example.

SUMMARY

An aspect of the technology provides a vehicle control apparatus for a vehicle. The vehicle control apparatus includes a catalyst deterioration diagnosing unit configured to execute a deterioration diagnosis of a catalyst included in an exhaust system of an engine provided in the vehicle, an engine controlling unit configured to control an air-fuel ratio of the engine to a lean side and thereafter to a rich side during the deterioration diagnosis of the catalyst, and a diagnosis start determining unit configured to prohibit the deterioration diagnosis of the catalyst from being executed when a deceleration rate upon deceleration of the vehicle is high, and permit the deterioration diagnosis of the catalyst to be executed when the deceleration rate upon deceleration of the vehicle is low.

An aspect of the technology provides a vehicle control apparatus for a vehicle. The vehicle control apparatus includes circuitry configured to execute a catalyst deterioration diagnosis of a catalyst included in an exhaust system of an engine provided in the vehicle, control an air-fuel ratio of the engine to a lean side and thereafter to a rich side during the deterioration diagnosis of the catalyst, prohibit the deterioration diagnosis of the catalyst from being executed when a deceleration rate upon deceleration of the vehicle is high, and permit the deterioration diagnosis of the catalyst to be executed when the deceleration rate upon deceleration of the vehicle is low.

BRIEF DESCRIPTION OF THE DRAWINGS

The accompanying drawings are included to provide a further understanding of the technology and are incorporated in and constitute a part of this specification. The drawings illustrate example implementations and, together with the specification, serve to explain the principles of the technology.

FIG. 1 is a schematic view of an example hybrid vehicle to which a vehicle control apparatus according to one implementation of the technology is applied to.

DETAILED DESCRIPTION

Figure 1:
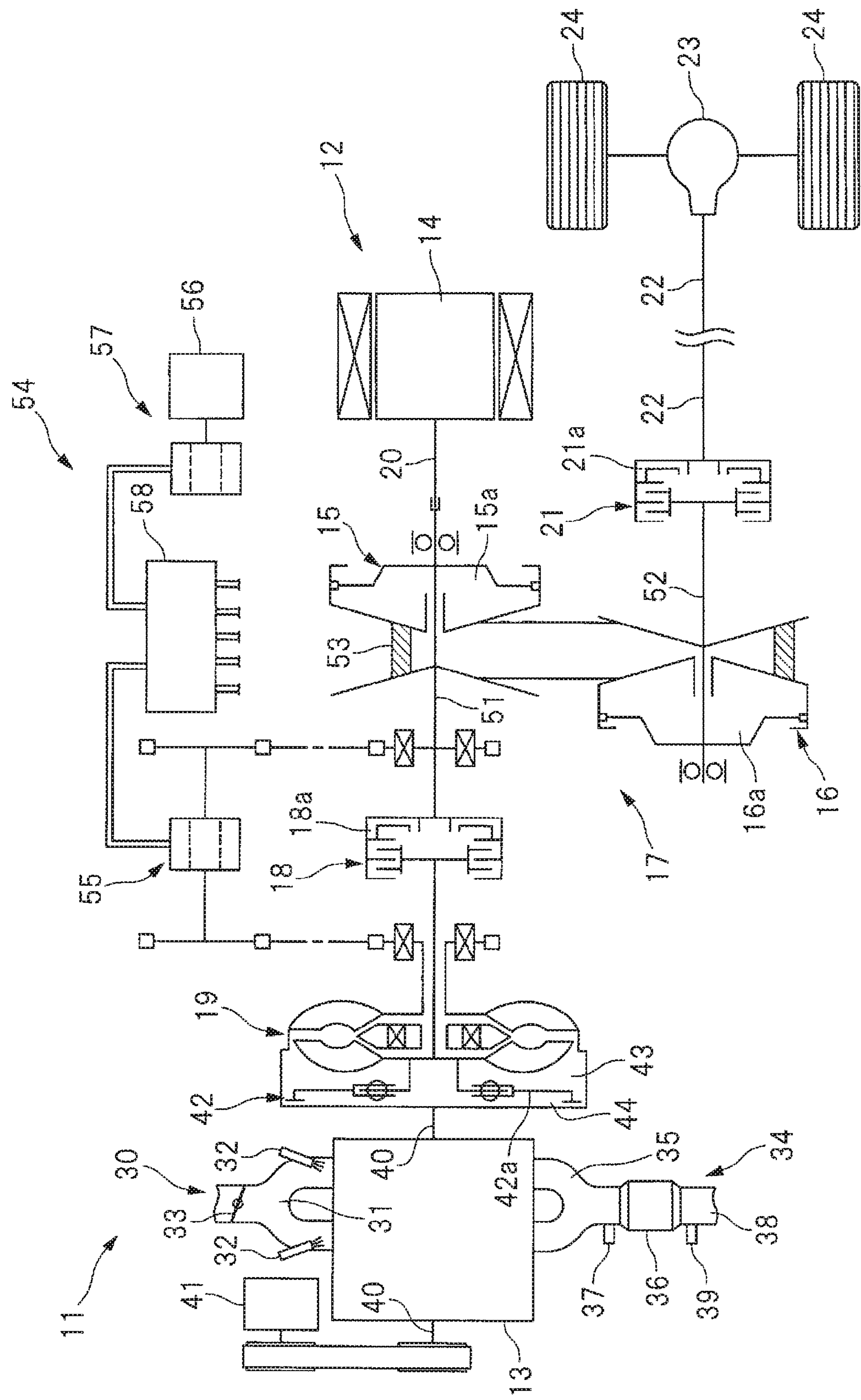

In the following, some preferred but non-limiting implementations of the technology are described in detail with reference to the accompanying drawings. Note that sizes, materials, specific values, and any other factors illustrated in respective implementations are illustrative for easier understanding of the technology, and are not intended to limit the scope of the technology unless otherwise specifically stated. Further, elements in the following example implementations which are not recited in a most-generic independent claim of the technology are optional and may be provided on an as-needed basis. Throughout the present specification and the drawings, elements having substantially the same function and configuration are denoted with the same reference numerals to avoid any redundant description. Further, elements that are not directly related to the technology are unillustrated in the drawings. The drawings are schematic and are not intended to be drawn to scale.

A catalyst deterioration diagnosis generally involves controlling an air-fuel ratio of an engine to a lean side for a predetermined period of time and thereafter to a rich side for a predetermined period of time. Unfortunately, the air-fuel ratio of the engine may possibly be prevented from being maintained at a predetermined condition depending on an accelerating or braking operation by a driver. This may possibly cause an interruption of the catalyst deterioration diagnosis. If the catalyst deterioration diagnosis is interrupted, another catalyst deterioration diagnosis may possibly need to be performed at another time. However, such a repeated execution of the catalyst deterioration diagnosis may possibly increase excess fuel injection. Accordingly, it has been required to execute the catalyst deterioration diagnosis at an appropriate timing to suppress an interruption of the catalyst deterioration diagnosis.

It is desirable to provide a vehicle control apparatus that makes it possible to execute a catalyst deterioration diagnosis at an appropriate timing.

Power Unit

FIG. 1 is a schematic view of a hybrid vehicle 11 to which a vehicle control apparatus 10 according to an example implementation of the technology may be applied to. In one implementation, the hybrid vehicle 11 may serve as a "vehicle". As illustrated in FIG. 1, the hybrid vehicle 11 may include a power unit 12 that may include, as power sources, an engine 13 and a motor generator 14. In one implementation, the motor generator 14 may serve as a "traveling motor". The power unit 12 may also include a continuously variable transmission 17 having a primary pulley 15 and a secondary pulley 16. The primary pulley 15 may have a first side coupled to the engine 13 through an input clutch 18 and a torque converter 19, and a second side coupled to the motor generator 14 through a rotary shaft 20. The secondary pulley 16 may be coupled to drive wheels 24 through an output clutch 21, a drive wheel output shaft 22, and a differential mechanism 23.

The engine 13 may have a non-illustrated intake port to which an intake manifold 31 of an intake system 30 is coupled. The intake manifold 31 may be provided with a plurality of injectors 32 and a throttle valve 33. The injectors 32 may inject a fuel to the intake port. The throttle valve 33 may regulate an intake air mass. Additionally, an exhaust manifold 35 of an exhaust system 34 may be coupled to the non-illustrated intake port of the engine 13. A catalytic converter 36 may be provided downstream of the exhaust manifold 35. In one implementation, the catalytic converter 36 may serve as a "catalyst". The catalytic converter 36 may purify an exhaust gas. An upstream oxygen ($O_2$) sensor 37 may be attached to the exhaust manifold 35 provided upstream of the catalytic converter 36. The upstream $O_2$ sensor may detect an oxygen concentration. An exhaust pipe 38 may be provided downstream of the catalytic converter 36. A downstream oxygen ($O_2$) sensor 39 may be attached to the exhaust pipe 38. The downstream $O_2$ sensor 39 may detect an oxygen concentration. The engine 13 may also include a crank shaft 40 that is coupled to a starter generator 41. The starter generator 41 may serve as a power generator and an electric motor.

The input clutch 18 provided between the torque converter 19 and the primary pulley 15 may have an engagement oil chamber 18*a*. To control the input clutch 18 to an engagement state, a hydraulic system 54, which will be described below, may supply hydraulic oil to the engagement oil chamber 18*a*. In contrast, to control the input clutch 18 to a release state, the hydraulic system 54 may cause the engagement oil chamber 18*a* to discharge the hydraulic oil. Controlling the input clutch 18 to the engagement state may couple the engine 13 and the continuously variable transmission 17 to each other. In contrast, controlling the input clutch 18 to the release state may disconnect the engine 13 and the continuously variable transmission 17 from each other.

A lock-up clutch 42 having a clutch plate 42*a* may be incorporated in the torque converter 19 provided between the engine 13 and the input clutch 18. The clutch plate 42*a* may have a first surface adjacent to an apply chamber 43, and a second surface adjacent to a release chamber 44. To control the lock-up clutch 42 to an engagement state, the hydraulic system 54, which will be described below, may supply hydraulic oil to the apply chamber 43 and cause the release chamber 44 to discharge the hydraulic oil. In contrast, to control the lock-up clutch 42 to a release state, the hydraulic system 54 may supply hydraulic oil to the release chamber 44 and cause the apply chamber 43 to discharge the hydraulic oil.

The continuously variable transmission 17 may include the primary pulley 15 provided on a primary shaft 51 and the secondary pulley 16 provided on a secondary shaft 52. A primary oil chamber 15*a* may be defined in the primary pulley 15, and a secondary oil chamber 16*a* may be defined in the secondary pulley 16. The primary pulley 15 and the secondary pulley 16 may be wound with a drive chain 53. To change the winding diameter of the drive chain 53, the hydraulic system 54, which will be described below, may adjust a hydraulic pressure of the primary oil chamber 15*a* and a hydraulic pressure of the secondary oil chamber 16*a*. This configuration allows for continuously-variable shifting from the primary shaft 51 to the secondary shaft 52.

The output clutch 21 may be provided between the secondary pulley 16 and the drive wheels 24 and may have an engagement oil chamber 21*a*. To control the output clutch 21 to an engagement state, the hydraulic system 54, which will be described below, may supply hydraulic oil to the engagement oil chamber 21*a*. In contrast, to control the output clutch 21 to a release state, the hydraulic system 54 may cause the engagement oil chamber 21*a* to discharge the hydraulic oil. Controlling the output clutch 21 to the engagement state may couple the continuously variable transmission 17 and the drive wheels 24 to each other. In contrast, controlling the output clutch 21 to the release state may disconnect the continuously variable transmission 17 and the drive wheels 24 from each other.

The power unit 12 may include the hydraulic system 54 that supplies hydraulic oil to the continuously variable transmission 17, the torque converter 19, the input clutch 18, and the output clutch 21, for example. The hydraulic system 54 may include oil pumps, such as a mechanical oil pump 55 and an electric oil pump 57. The mechanical oil pump 55 may be driven by the engine 13 and the primary shaft 51. The electric oil pump 57 may be driven by an electric motor 56. The hydraulic system 54 may also include a valve unit 58 that includes an electromagnetic valve and an oil passage. The valve unit 58 may cause the hydraulic oil to be supplied to a destination and may control the pressure of the hydraulic oil.

Control System

Figure 2:
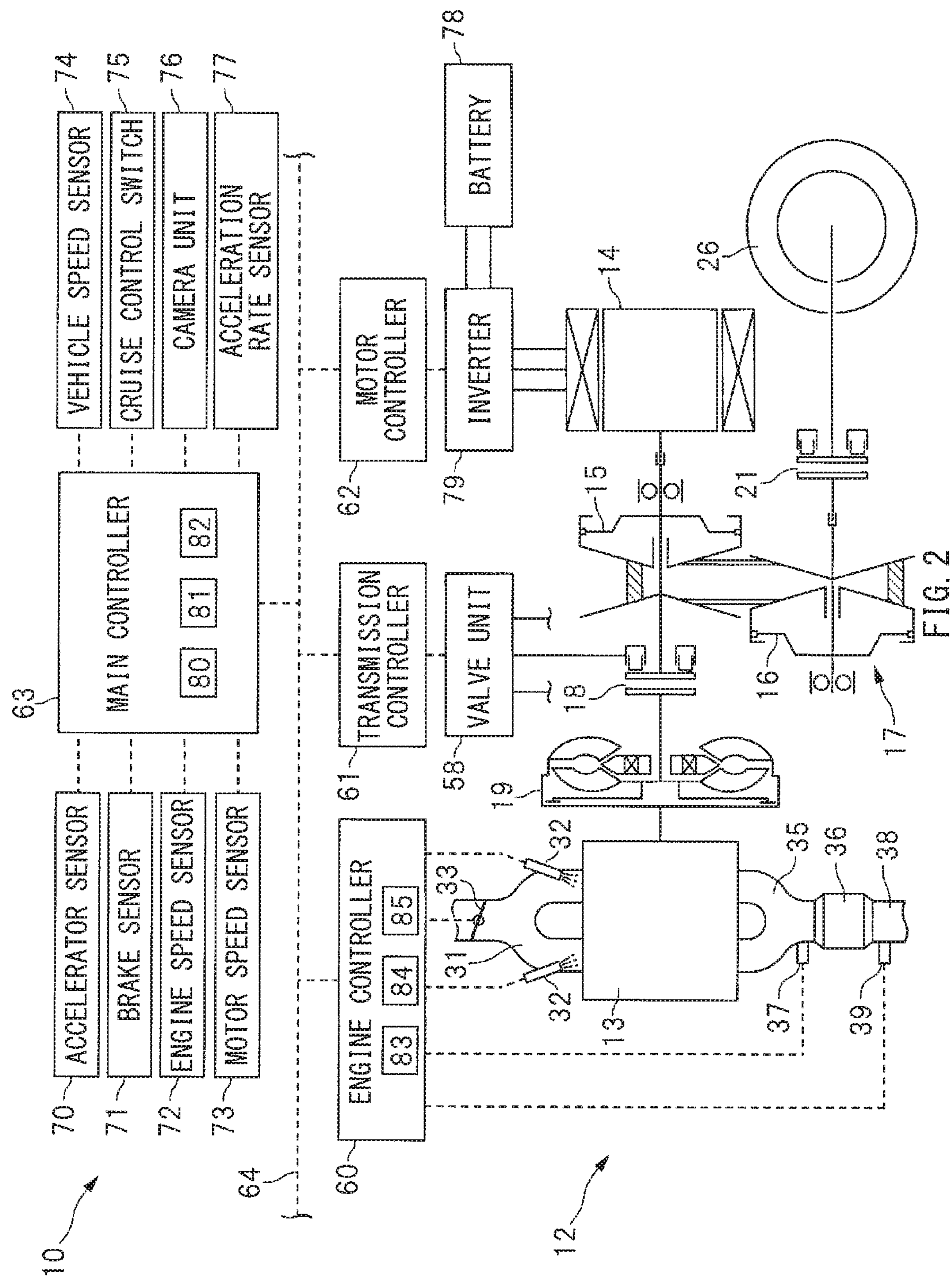
FIG. 2 is a schematic diagram of an example control system of the vehicle control apparatus illustrated in FIG. 1.

FIG. 2 is a schematic diagram of an example control system of the vehicle control apparatus 10. As illustrated in FIG. 2, the vehicle control apparatus 10 may include various controllers to control an operating state of the power unit 12. The controllers may be, for example but not limited to, microcomputers. Non-limiting examples of these controllers may include: an engine controller 60 that controls the engine 13; a transmission controller 61 that controls, for example, the input clutch 18 and the continuously variable transmission 17; a motor controller 62 that controls the motor generator 14; and a main controller 63 that comprehensively controls the engine controller 60, the transmission controller 61, and the motor controller 62. These four controllers may be communicatively coupled to each other via an in-vehicle network 64, such as a controller area network (CAN) or a local interconnect network (LIN).

The main controller 63 may output a control signal to each of the controllers (i.e., the engine controller 60, the transmission controller 61, and the motor controller 62) to cause, for example, the engine 13, the motor generator 14, and the continuously variable transmission 17 to operate in cooperation with each other. A plurality of sensors may be coupled to the main controller 63. Non-limiting examples of the sensors may include an accelerator sensor 70, a brake sensor 71, an engine speed sensor 72, a motor speed sensor 73, a vehicle speed sensor 74, a cruise control switch 75, a camera unit 76, and an acceleration rate sensor 77. The accelerator sensor 70 may detect an operating state of an accelerator pedal. The brake sensor 71 may detect an operating state of a brake pedal. The engine speed sensor 72 may detect a rotational speed of the engine 13. The motor speed sensor 73 may detect a rotational speed of the motor generator 14. The vehicle speed sensor 74 may detect a vehicle speed, which is a traveling speed of the vehicle. The cruise control switch 75 may be operated to perform a cruise control that controls traveling of the vehicle at a constant speed. The camera unit 76 may obtain information on an image of a region in front of the vehicle. The acceleration rate sensor 77 may detect an acceleration rate of the vehicle in a frontward or backward direction.

The main controller 63 may set control targets of the engine 13 and the motor generator 14, and any other component on the basis of information transmitted from the various sensors and the various controllers, and may output control signals based on the control targets to the respective controllers (i.e., the engine controller 60, the transmission controller 61, and the motor controller 62). Each of the controllers (i.e., the engine controller 60, the transmission controller 61, and the motor controller 62) that has received the control signal from the main controller 63 may control, for example but not limited to, the engine 13 and the motor generator 14. In an example implementation of the technology, the engine controller 60 may output the control signal to, for example but not limited to, the injector 32 and the throttle valve 33 to control the engine torque and the engine speed. The transmission controller 61 may output the control signal to the valve unit 58 that regulates the pressure of hydraulic oil to control the operating states of the continuously variable transmission 17, the input clutch 18, the output clutch 21, and the torque converter 19, for example. The motor controller 62 may output the control signal to an inverter 79 that couples the motor generator 14 and the battery 78 to control the motor torque and the motor speed of the motor generator 14.

Traveling Modes

The hybrid vehicle 11 may have a plurality of traveling modes including an engine traveling mode and a motor traveling mode. The engine traveling mode may cause the engine 13 to operate, and the motor traveling mode may cause the engine 13 to stop and the motor generator 14 to operate. To perform these traveling modes, the main controller 63 may include some units, such as an engine traveling mode controller 80, a motor traveling mode controller 81, and a traveling mode switch 82.

To perform the engine traveling mode, the engine traveling mode controller 80 may output a control signal to each of the controllers (i.e., the engine controller 60, the transmission controller 61, and the motor controller 62). The control signal may be directed to control each operational component, such as the engine 13 in the power unit 12. To perform the motor traveling mode, the motor traveling mode controller 81 may output the control signal to each of the controllers (i.e., the engine controller 60, the transmission controller 61, and the motor controller 62). The control signal may be directed to control each operational component, such as the motor generator 14 in the power unit 12. The traveling mode switch 82 may switch the traveling mode of the vehicle between the engine traveling mode and the motor traveling mode on the basis of the traveling state of the vehicle and the state of the driving operation.

Figure 3A:
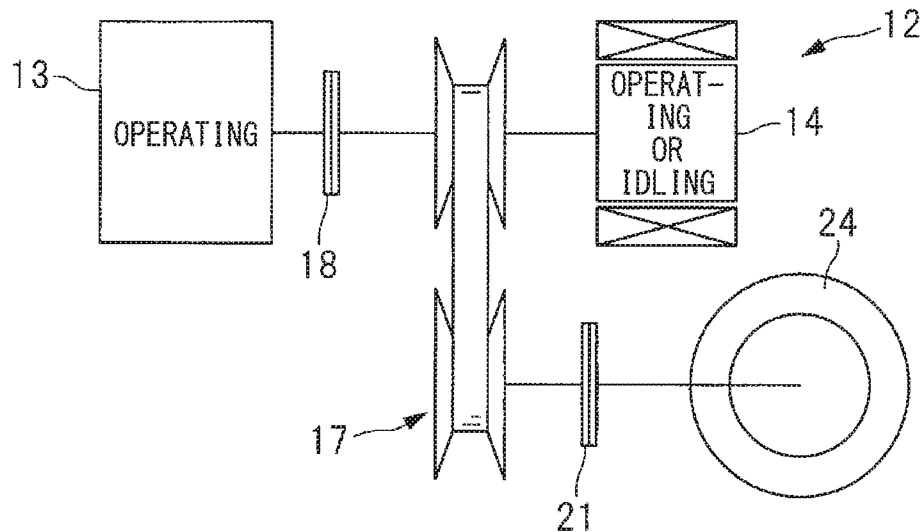
FIG. 3A is a schematic diagram illustrating an example operating state of a power unit in an engine traveling mode.
Figure 3B:
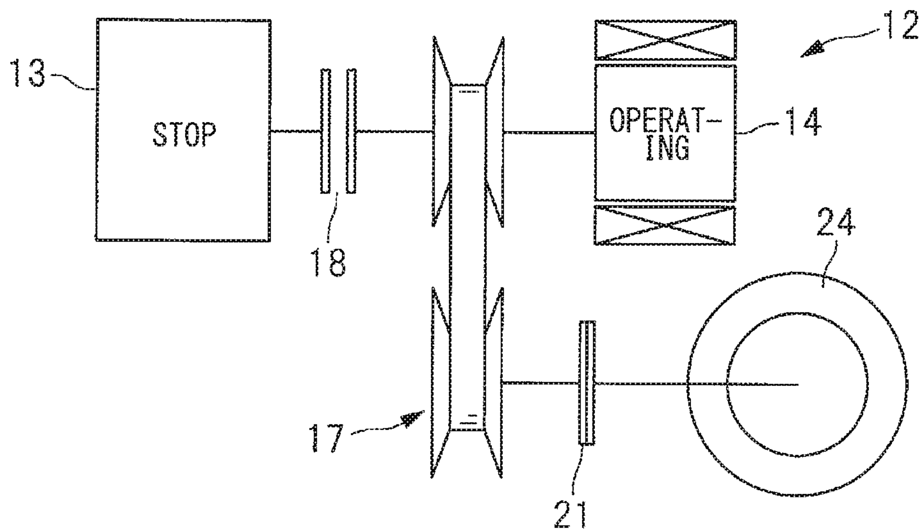
FIG. 3B is a schematic diagram illustrating an example operating state of the power unit in a motor traveling mode.

FIG. 3A is a schematic diagram illustrating an example operating state of the power unit 12 in the engine traveling mode. FIG. 3B is a schematic diagram illustrating an example operating state of the power unit 12 in the motor traveling mode. Referring to FIG. 3A, the input clutch 18 and the output clutch 21 may be controlled to the engagement state, and the engine 13 may be controlled to an operating or driving state in the engine traveling mode. This allows engine power to be outputted from the engine 13 to the drive wheels 24 through the input clutch 18, the continuously variable transmission 17, and the output clutch 21. Note that, to perform the engine traveling mode, the motor generator 14 may be controlled to a power running state, a regenerative state, or an idling state.

Referring to FIG. 3B, the input clutch 18 may be controlled to the release state, the output clutch 21 to the engagement state, the engine 13 to a stopping state, and the motor generator 14 to an operating state in the motor traveling mode. This may disconnect the engine 13 from the drive wheels 24, and couple the motor generator 14 to the drive wheels 24. Note that the term "operating state" of the motor generator 14 may include the power running state and the regenerative state of the motor generator 14. The term "power running state" of the motor generator 14 refers to a state in which a power running torque for acceleration is generated in the motor generator 14, and the term "regenerative state" of the motor generator 14 refers to a state in which a regenerative torque for deceleration is generated in the motor generator 14.

Catalyst Deterioration Diagnosis

The vehicle control apparatus 10 performs a deterioration diagnosis of the catalytic converter 36 (hereinafter also referred to as "catalyst deterioration diagnosis"). The catalytic converter 36 may take in and store oxygen therein when the air-fuel ratio is controlled to the lean side, and may release the oxygen when the air-fuel ratio is controlled to the rich side. A reduction in the oxygen storage capacity of the catalytic converter 36 may possibly lead to a reduction in the performance of the catalytic converter 36 to purify an exhaust gas. The oxygen storage capacity of the catalytic converter 36, therefore, needs to be diagnosed periodically. To perform such a diagnosis of the oxygen storage capacity of the catalytic converter 36, the vehicle control apparatus 10 controls the air-fuel ratio of the engine 13 to the lean side, and thereafter to the rich side. On the basis of a transition of an air-fuel ratio at downstream of the catalytic converter 36 (hereinafter referred to as "the air-fuel ratio at a catalyst downstream side"), the vehicle control apparatus 10 determines the oxygen storage capacity of the catalytic converter 36. Note that the wording "control the air-fuel ratio to the lean side" means that reducing the ratio of the fuel compared with a theoretical air-fuel ratio, and the wording "control the air-fuel ratio to the rich side" means that increasing the ratio of the fuel compared to the theoretical air-fuel ratio. The air-fuel ratio at the catalyst downstream side may be detected by the downstream $O_2$ sensor 39.

Figure 4A:
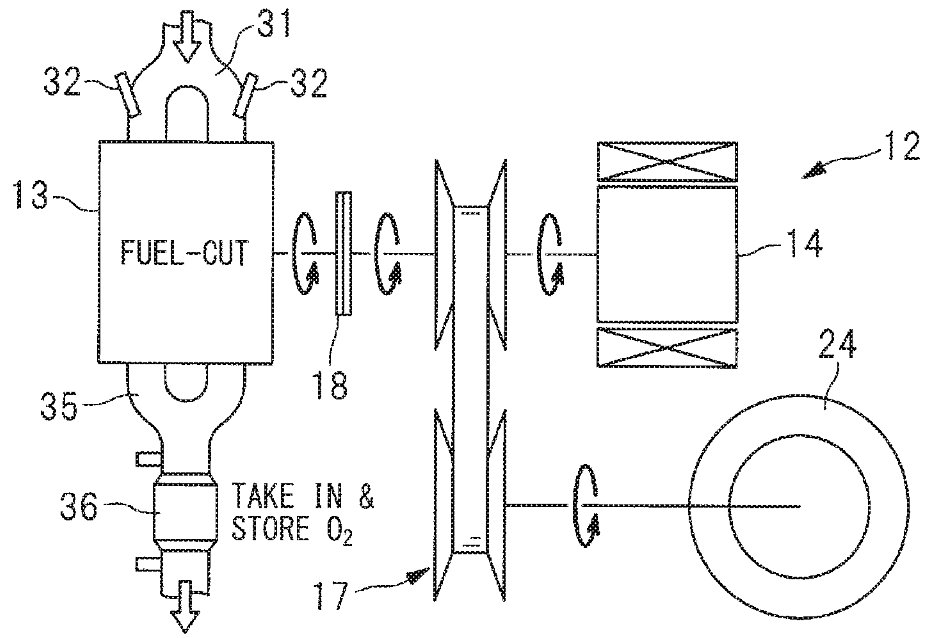
FIG. 4A is a schematic diagram illustrating an example operating state of the power unit during a catalyst deterioration diagnosis according to one implementation of the technology.
Figure 4B:
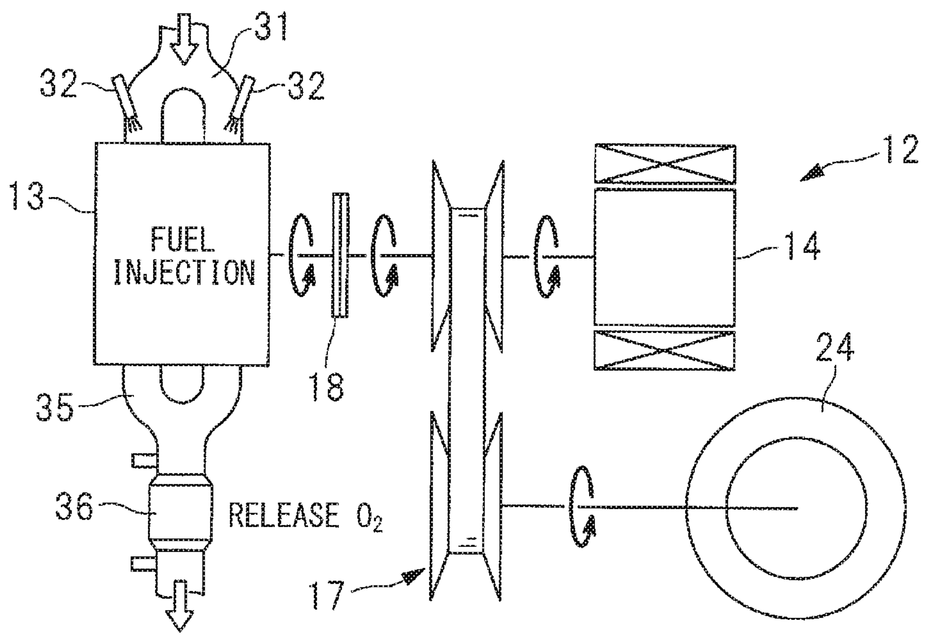
FIG. 4B is a schematic diagram illustrating another example operating state of the power unit during the catalyst deterioration diagnosis.

FIGS. 4A and 4B each schematically illustrate an example operating state of the power unit 12 during the catalyst deterioration diagnosis according to an example implementation of the technology. During the catalyst deterioration diagnosis, as illustrated in FIG. 4A, fuel-cut, which restricts fuel supply to the engine 13 of the traveling vehicle, may be performed, and the air-fuel ratio of the engine 13 is thereby controlled to the lean side for a predetermined period of time. This excessively increases the amount of oxygen ($O_2$) in the exhaust gas, so that the $O_2$ in the exhaust gas may be taken in and stored in the catalytic converter 36. Thereafter, as illustrated in FIG. 4B, the fuel injection by the engine 13 may restart, and the air-fuel ratio of the engine 13 is thereby controlled to the rich side for a predetermined period of time. This excessively reduce the amount of oxygen ($O_2$) in the exhaust gas, so that the $O_2$ may be released from the catalytic converter 36 to the exhaust gas. This allows for determination of the oxygen storage capacity of the catalytic converter 36 based on an elapsed time from the time at which the air-fuel ratio of the engine 13 is changed to a predetermined rich condition to the time at which the air-fuel ratio at the catalyst downstream side is changed to the predetermined rich condition, for example. If the air-fuel ratio at the catalyst downstream side is changed to the predetermined rich condition before a lapse of a predetermined time after the restart of the fuel injection, for example, it may possibly indicate that the oxygen storage capacity of the catalytic converter 36 has been reduced. Therefore, the catalytic converter 36 may be diagnosed as being deteriorated.

To perform such a catalyst deterioration diagnosis, as illustrated in FIG. 2, the engine controller 60 includes some units such as a diagnosis start determining unit 83, a catalyst deterioration diagnosing unit 84, and an engine controlling unit 85. Although described in detail below, the diagnosis start determining unit 83 determines whether a condition for starting the catalyst deterioration diagnosis is satisfied. In other words, the diagnosis start determining unit 83 determines whether the execution of the catalyst deterioration diagnosis to be permitted. When the diagnosis start determining unit 83 permits the execution of the catalyst deterioration diagnosis, the engine controlling unit 85 controls the air-fuel ratio of the engine 13 to the lean side, and thereafter to the rich side, and the catalyst deterioration diagnosing unit 84 diagnoses the deterioration state of catalytic converter 36 on the basis of the air-fuel ratio at the catalyst downstream side. When the diagnosis start determining unit 83 prohibits the execution of the catalyst deterioration diagnosis, the traveling mode switch 82 of the main controller 63 may switch the engine traveling mode to the motor traveling mode. In contrast, when the diagnosis start determining unit 83 permits the execution of the catalyst deterioration diagnosis, the traveling mode switch 82 may maintain the engine traveling mode. These operation of the traveling mode switch 82 is described in detail below.

Catalyst Deterioration Diagnosis Control (Flowchart)

Figure 5:
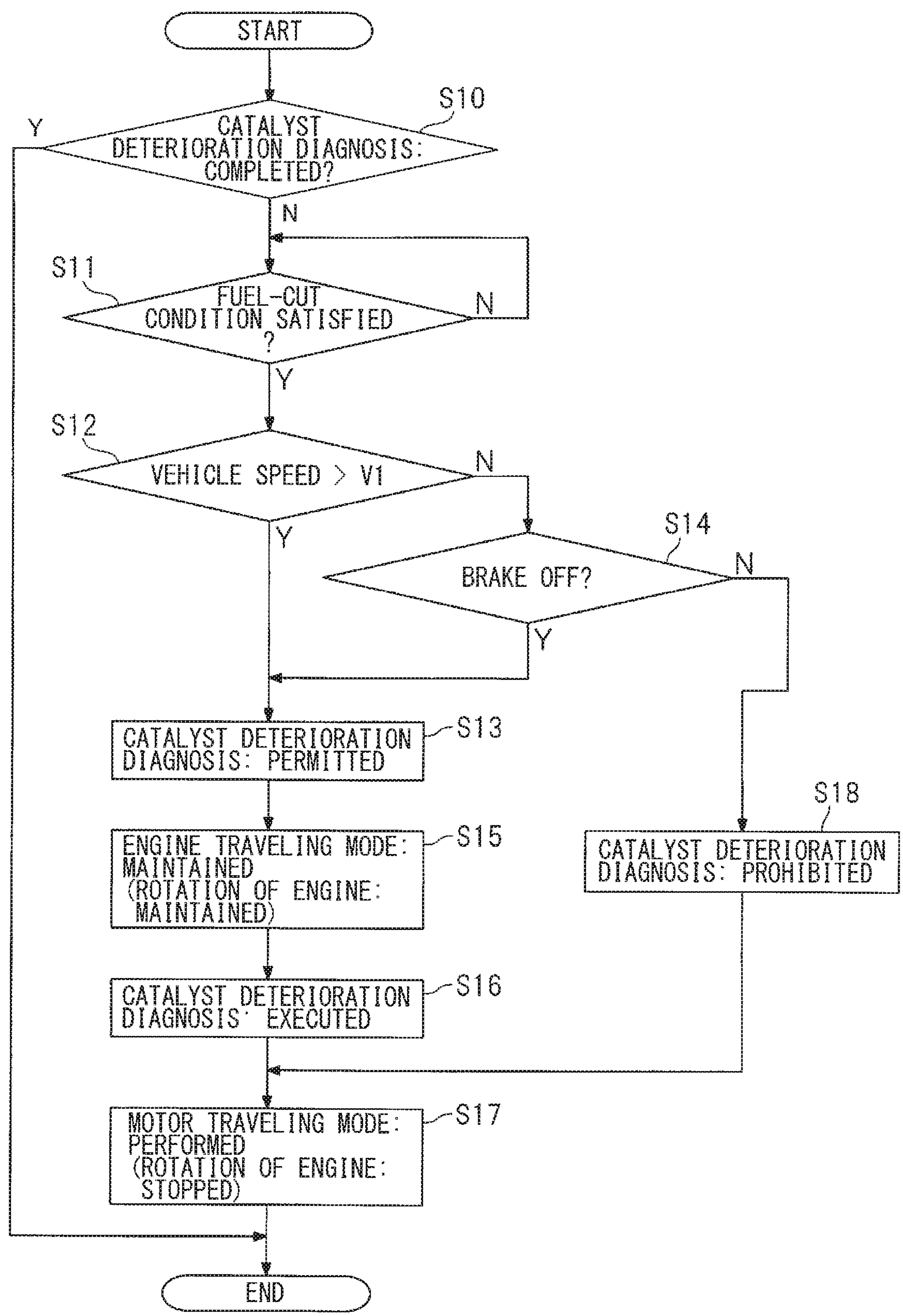
FIG. 5 is a flowchart of an example execution procedure of the catalyst deterioration diagnosis performed by the vehicle control apparatus illustrated in FIG. 1.

Now described is control of the catalyst deterioration diagnosis that diagnoses the deterioration of the catalytic converter 36. FIG. 5 is a flowchart of an example execution procedure of the catalyst deterioration diagnosis performed by the vehicle control apparatus 10. The vehicle control apparatus 10 according to this implementation may perform the catalyst deterioration diagnosis once between activation and termination of the control system of the vehicle. The term "brake OFF" in the flowchart refers to a state in which a braking operation is not performed (i.e., the brake pedal is not pressed).

As illustrated in FIG. 5, Step S10 may determine whether the catalyst deterioration diagnosis has been completed. When the catalyst deterioration diagnosis has been already completed ("Y" in Step S10), the procedure may exit from the routine without executing another catalyst deterioration diagnosis. When the catalyst deterioration diagnosis has not been completed ("N" in Step S10), the procedure may proceed to Step S11 that may determine whether a predetermined fuel-cut condition, i.e., a condition for stopping fuel injection is satisfied. Note that the fuel-cut condition may be satisfied when the accelerator pedal is released from being pressed in the engine traveling mode or when the vehicle speed reaches an upper speed limit during the cruise control in the engine traveling mode, for example. In other words, the fuel-cut condition may be satisfied when the vehicle in the engine traveling mode decelerates.

When Step S11 determines that the fuel-cut condition is satisfied ("Y" in Step S11), the procedure may proceed to Step S12 that may determine whether the vehicle speed is greater than a vehicle speed threshold V1. When Step S12 determines that the vehicle speed is greater than the vehicle speed threshold V1 ("Y" in Step S12), i.e., when Step S12 determines that the vehicle is traveling in a high vehicle speed range, the procedure may proceed to Step S13 that permits the catalyst deterioration diagnosis to be executed. In contrast, when Step S12 determines that the vehicle speed is equal to or less than the vehicle speed threshold V1 ("N" in Step S12), i.e., when Step S12 determines that the vehicle is traveling in a low vehicle speed range, the procedure may proceed to Step S14 that may determine whether the braking operation is released. When Step S14 determines that the braking operation is released ("Y" in Step S14), the procedure proceeds to Step S13 that permits the execution of the catalyst deterioration diagnosis. Note that the state in which the braking operation is released may indicate the state in which the deceleration rate upon deceleration of the vehicle is low. In one implementation, the condition in which the vehicle speed is greater than a vehicle speed threshold may serve as a "first condition". In one implementation, the condition in which the vehicle speed is less than the vehicle speed threshold and the deceleration rate upon deceleration of the vehicle is low may serve as a "second condition".

As described above, the execution of the catalyst deterioration diagnosis is permitted in Step S13 when the vehicle is traveling in the high vehicle speed range or when the vehicle is traveling in the low vehicle speed range without the braking operation being performed. Once the execution of the catalyst deterioration diagnosis is permitted, the engine traveling mode may be maintained in Step S15, and the catalyst deterioration diagnosis is executed in Step S16. During the catalyst deterioration diagnosis, the fuel injection may be halted for a predetermined period of time, thereby controlling the air-fuel ratio of the engine 13 to the lean side. Thereafter, the fuel injection may be performed for a predetermined period of time, thereby controlling the air-fuel ratio of the engine 13 to the rich side. For example, on the basis of the elapsed time from the time at which the air-fuel ratio of the engine 13 is changed to a predetermined rich condition to the time at which the air-fuel ratio at the catalyst downstream side is changed to a predetermined rich condition, a reduction in the oxygen storage capacity, i.e., deteriorated state of the catalytic converter 36 may be diagnosed.

After the catalyst deterioration diagnosis is completed, the procedure may proceed to Step S17 that may switch the engine traveling mode to the motor traveling mode. As described above, the execution of the catalyst deterioration diagnosis is permitted when the vehicle decelerates, and the deceleration of the vehicle may involve regenerative braking. Accordingly, switching the engine traveling mode to the motor traveling mode may disconnect the engine 13 from the drive wheel 24, thereby increasing the regenerative torque of the motor generator 14 to recover much kinetic energy.

In contrast, when Step S12 determines that the vehicle is traveling in the low vehicle speed range ("N" in Step S12) and Step S14 determines that the braking operation is performed ("N" in Step S14), the procedure proceeds to Step S18 that prohibits the catalyst deterioration diagnosis from being executed. In other words, when the vehicle is traveling in the low vehicle speed range with the braking operation being performed, the procedure proceeds to Step S18 that prohibits the execution of the catalyst deterioration diagnosis. Thereafter, the procedure may proceed to Step S17 that may switch the engine traveling mode to the motor traveling mode. When the execution of the catalyst deterioration diagnosis is prohibited as described above, there may be no necessity to maintain the engine speed for the control of the air-fuel ratio to the lean side. Accordingly, the engine traveling mode may be immediately switched to the motor traveling mode to disconnect the engine 13 from the drive wheels 24, thereby increasing the regenerative torque of the motor generator 14 to recover much kinetic energy.

As described above with reference to the flowchart, the execution of the catalyst deterioration diagnosis is prohibited when the vehicle traveling in the low vehicle speed range decelerates with the braking operation being performed. In contrast, the execution of the catalyst deterioration diagnosis is permitted when the vehicle traveling in the low vehicle speed range decelerates without the braking operation being performed. In other words, the execution of the catalyst deterioration diagnosis is prohibited when a deceleration rate upon deceleration of the vehicle traveling in the low vehicle speed range is increased by the braking operation. In contrast, the execution of the catalyst deterioration diagnosis is permitted when the deceleration rate upon deceleration of the vehicle traveling in the low vehicle speed range is reduced without the braking operation being performed. As described above, whether the catalyst deterioration diagnosis is to be executed is determined depending on the deceleration rate upon deceleration of the vehicle. Accordingly, it is possible to execute the catalyst deterioration diagnosis at an appropriate timing and further suppress an interruption of the catalyst deterioration diagnosis.

During the catalyst deterioration diagnosis, the air-fuel ratio is controlled to the lean side for a predetermined period of time. This requires that the engine traveling mode be maintained to keep the engine speed even while the vehicle is decelerating. If the vehicle decelerates at a high deceleration rate and stops in a short period of time in such a circumstance, it may possibly cause difficulty in keeping the engine speed while maintaining the fuel-cut condition, and in turn, difficulty in controlling the air-fuel ratio to the lean side. In other words, the deceleration of the vehicle at a high deceleration rate may possibly interrupt the catalyst deterioration diagnosis. To address such a concern, in an example implementation of technology, the execution of the catalyst deterioration diagnosis is preliminarily prohibited when the vehicle decelerates at a high deceleration rate. This avoids repeated execution of the catalyst deterioration diagnosis, reduces fuel injections associated with the catalyst deterioration diagnosis, and suppresses a decrease in regenerative electric power due to the maintenance of the engine traveling mode. Note that, if the vehicle traveling in the high vehicle speed range decelerates at a high deceleration rate, the vehicle may stop in a certain time. Therefore, in an example implementation of technology, the execution of the catalyst deterioration diagnosis is permitted regardless of the braking operation.

Catalyst Deterioration Diagnosis: Permitted (Timing Chart)

Figure 6:
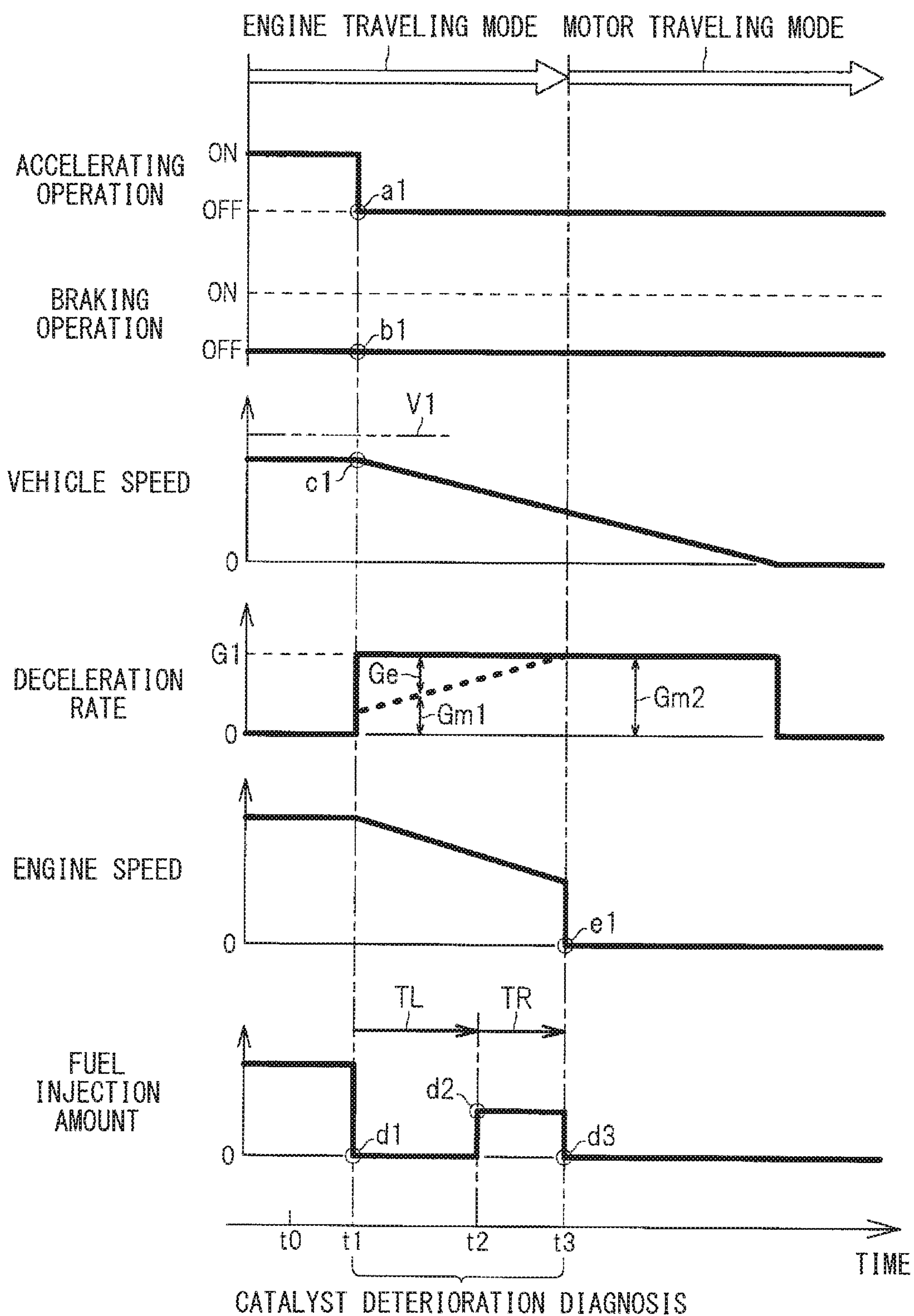
FIG. 6 is an example timing chart illustrating a deceleration state in which the catalyst deterioration diagnosis is permitted to be executed.
Figure 7A:
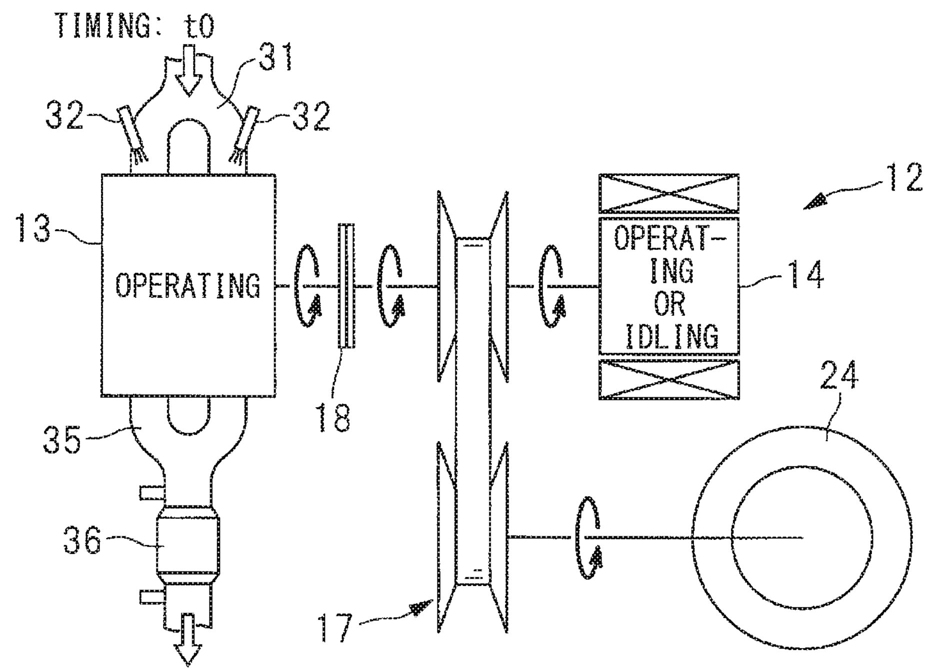
FIG. 7A is a schematic diagram illustrating an example operating state of the power unit at a timing t0 in FIG. 6.

The deceleration state in which the execution of the catalyst deterioration diagnosis is permitted will now be described with reference to a timing chart. FIG. 6 is a timing chart illustrating an example deceleration state in which the execution of the catalyst deterioration diagnosis is permitted. FIGS. 7A, 7B, 8A, and 8B schematically illustrate operating states of the power unit 12 at respective timings t0 to t3 illustrated in FIG. 6. In other words, FIG. 7A illustrates the operating state of the power unit 12 at the timing t0, FIG. 7B at the timing t1, FIG. 8A at the timing t2, and FIG. 8B at the timing t3. Note that the term "accelerating operation ON" in FIG. 6 refers to a state in which an accelerating operation is performed, i.e., the accelerator pedal is pressed. The term "braking operation ON" in FIG. 6 refers to a state in which the braking operation is performed, i.e., the brake pedal is pressed. The term "accelerating operation OFF" in FIG. 6 refers to a state in which the accelerating operation is not performed, i.e, the accelerator pedal is not pressed. The term "braking operation OFF" refers to a state in which the braking operation is not performed, i.e., the brake pedal is not pressed.

As illustrated in FIG. 6, the accelerating operation may be released by the driver at the timing t1 (corresponding to a timing a1) during the traveling in the engine traveling mode. At the timing t1, the braking operation may not be performed (at a timing b1), and the vehicle speed may be less than the vehicle speed threshold V1 (at a timing c1). In other words, the vehicle traveling in the low vehicle speed range may decelerate without the braking operation being performed at the timing t1. This deceleration state permits the execution of the catalyst deterioration diagnosis. Once the execution of the catalyst deterioration diagnosis is permitted, the fuel injection to the engine 13 may be halted at the timing t1 (corresponding to a timing d1), and the air-fuel ratio of the engine 13 is controlled to the lean side for a predetermined period of time TL. After the control of the air-fuel ratio of the engine 13 to the lean side for the predetermined period of time TL, the fuel injection to the engine 13 may be restarted at the timing t2 (corresponding to a timing d2), the air-fuel ratio of the engine 13 is controlled to the rich side for a predetermined period of time TR. As described above, after the control of the air-fuel ratio of the engine 13 to the lean side from the timing t1 to the timing t2, the air-fuel ratio of the engine 13 is controlled to the rich side from the timing t2 to the timing t3, and the deterioration diagnosis of the catalytic converter 36 may be completed. Upon the completion of the catalyst deterioration diagnosis at the timing t3, the fuel injection to the engine 13 may be halted (at a timing d3), and the engine traveling mode may be switched to the motor traveling mode to disconnect the engine 13 from the drive wheels 24, thereby stopping the engine 13 (at a timing e1).

Figure 7B:
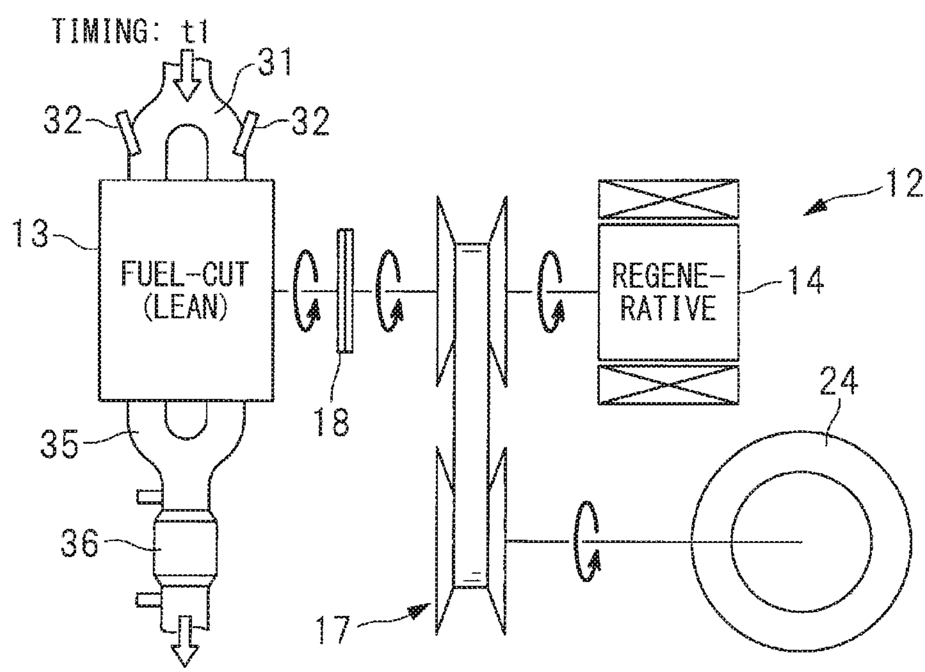
FIG. 7B is a schematic diagram illustrating an example operating state of the power unit at a timing t1 in FIG. 6.
Figure 8A:
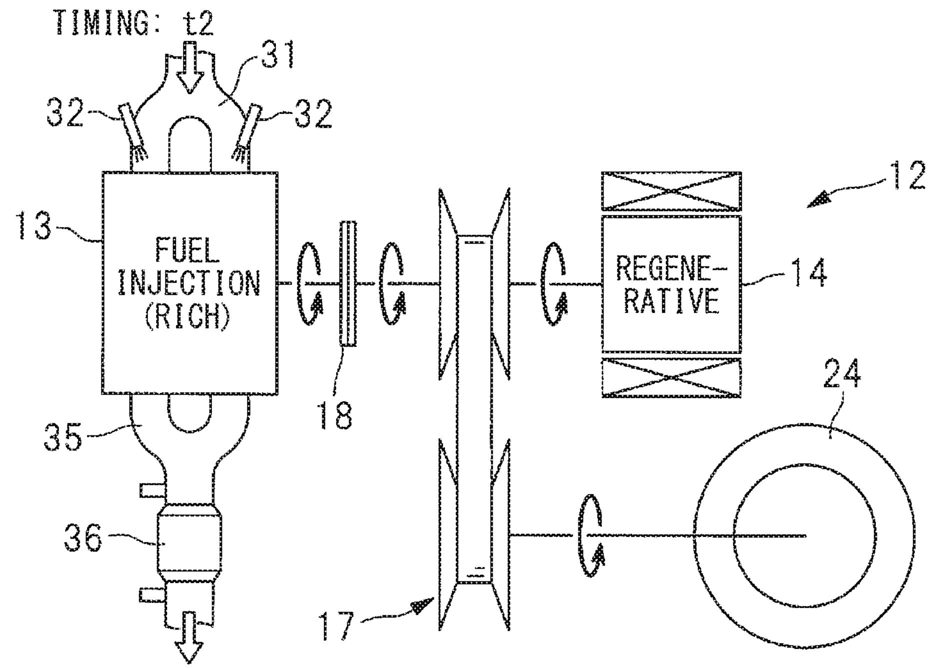
FIG. 8A is a schematic diagram illustrating an example operating state of the power unit at a timing t2 in FIG. 6.
Figure 8B:
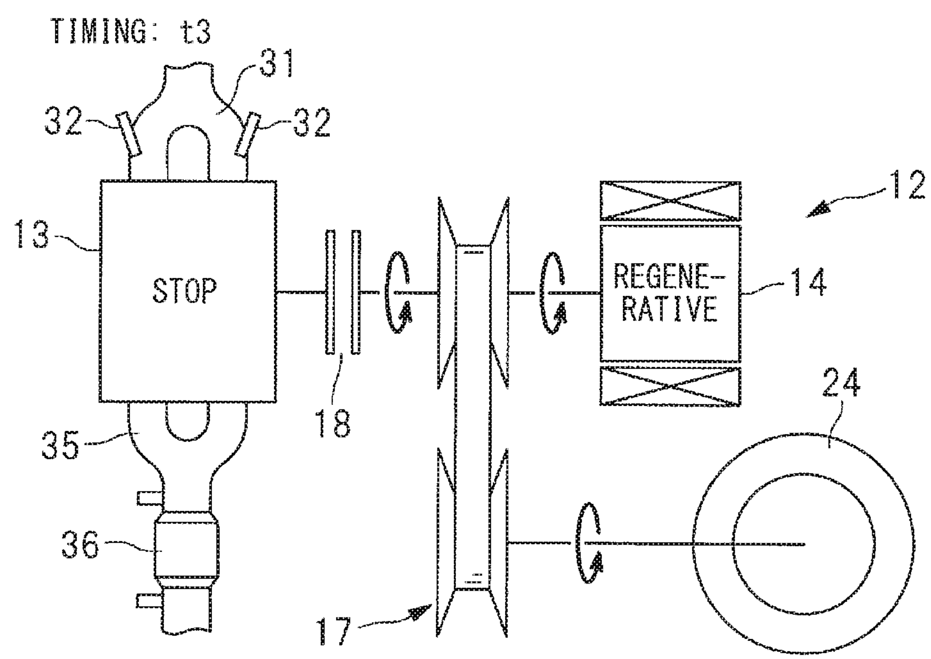
FIG. 8B is a schematic diagram illustrating an example operating state of the power unit at a timing t3 in FIG. 6.

Now described is a regenerative control of the motor generator 14 in the deceleration state in which the execution of the catalyst deterioration diagnosis is permitted. With reference to FIG. 7A, during the traveling in the engine traveling mode, the motor generator 14 may be controlled to the power running state, the regenerative state, or the idling state, depending on a drive force required for the vehicle and a state of charge of the battery 78. Thereafter, the fuel injection may be halted in conjunction with the release of the accelerating operation. The traveling state at this timing may correspond to the deceleration state in which the execution of the catalyst deterioration diagnosis is permitted. Accordingly, as illustrated in FIG. 7B, the air-fuel ratio is controlled to the lean side while the engine traveling mode is maintained, and the motor generator 14 may be controlled to the regenerative state within a range not exceeding a target deceleration rate of the vehicle. Further, with reference to FIG. 8A, even after the fuel injection is restarted and the air-fuel ratio is controlled to the rich side, the motor generator 14 may be controlled to the regenerative state within the range not exceeding the target deceleration rate of the vehicle. For example, as illustrated in FIG. 6, a deceleration rate Ge associated with braking of the engine 13 may be generated during the catalyst deterioration diagnosis. Accordingly, a deceleration rate Gm1 associated with the regenerative torque of the motor generator 14 may be adjusted so that the deceleration rate upon deceleration of the vehicle does not exceed the target deceleration rate G1. Referring to FIG. 8B, after the completion of the catalyst deterioration diagnosis, the engine traveling mode may be switched to the motor traveling mode to disconnect the engine 13 from the drive wheel 24. This increases the regenerative torque of the motor generator 14. For example, as illustrated in FIG. 6, the regenerative torque of the motor generator 14 may be increased to a level at which a deceleration rate Gm2 associated with the regenerative torque reaches the target deceleration rate G1 of the vehicle.

Catalyst Deterioration Diagnosis: Prohibited (Timing Chart)

Figure 9:
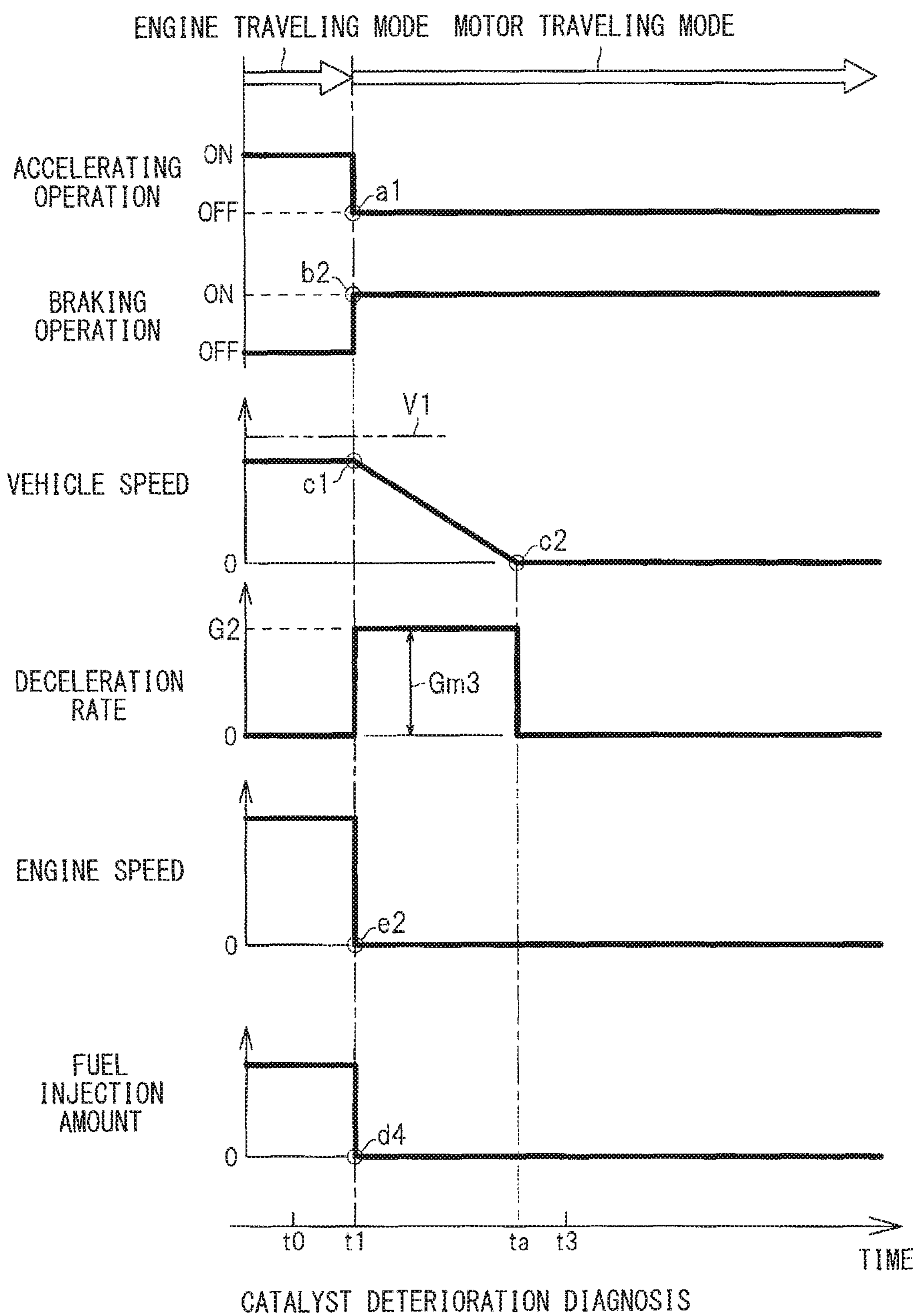
FIG. 9 is an example timing chart illustrating a deceleration state in which the catalyst deterioration diagnosis is prohibited from being executed.
Figure 10A:
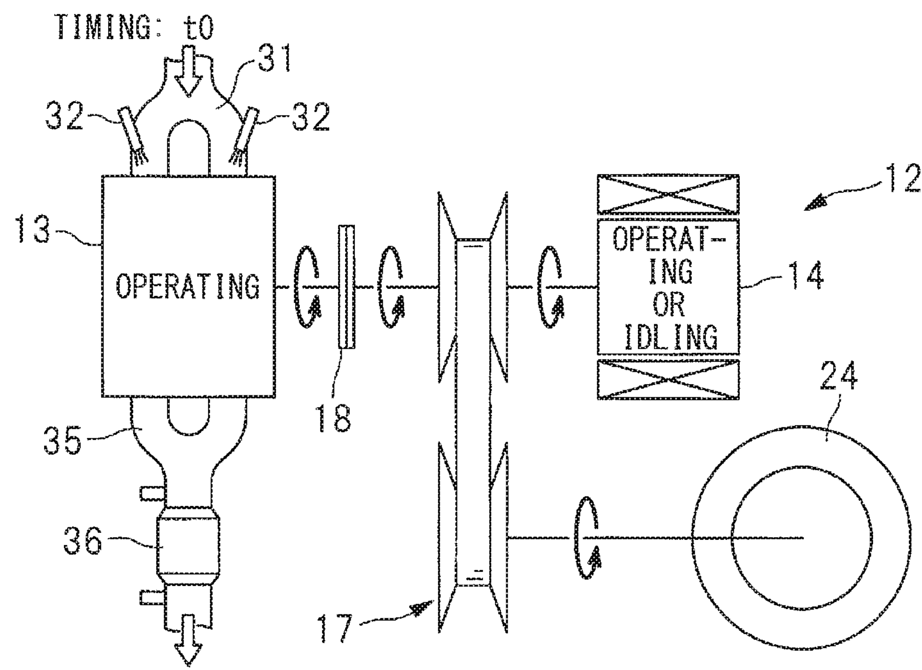
FIG. 10A is a schematic diagram illustrating an example operating state of the power unit at a timing t0 in FIG. 9.
Figure 10B:
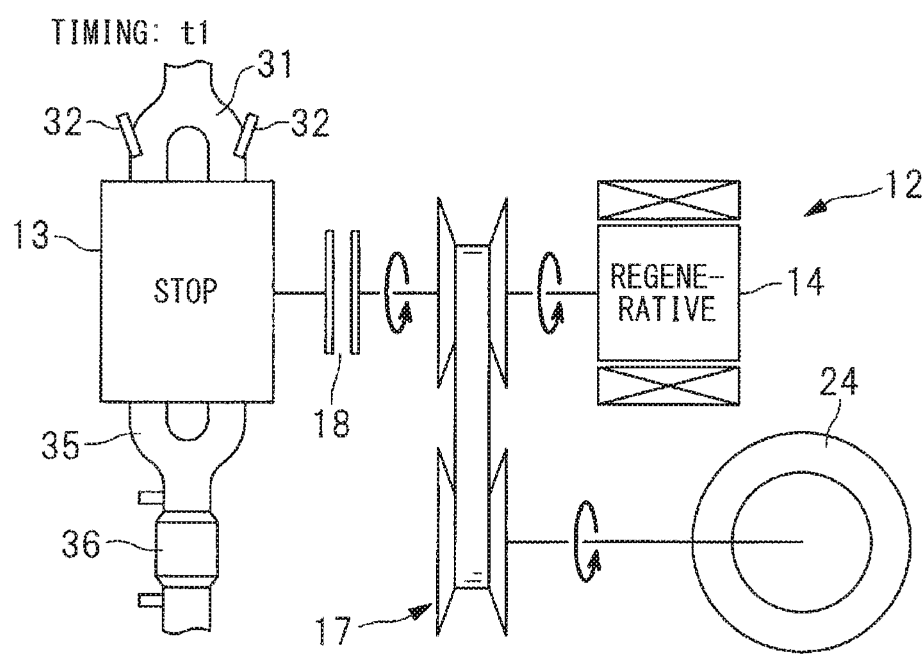
FIG. 10B is a schematic diagram illustrating an example operating state of the power unit at a timing t1 in FIG. 9.

The deceleration state in which the execution of the catalyst deterioration diagnosis is prohibited will now be described with a timing chart. FIG. 9 is a timing chart illustrating an example deceleration state in which the execution of the catalyst deterioration diagnosis is prohibited. FIGS. 10A and 10B schematically illustrate operating states of the power unit 12 at respective timings t0 and t1 illustrated in FIG. 9. In other words, FIG. 10A illustrates the operating state of the power unit 12 at the timing t0, and FIG. 10B at the timing t1. Note that, in FIG. 9, a state common to that in FIG. 6 is denoted with the same reference symbol.

As illustrated in FIG. 9, the accelerating operation may be released by the driver at the timing t1 (corresponding to the timing a1) during the traveling in the engine traveling mode. At the timing t1, the braking operation may be performed (at a timing b2), and the vehicle speed may be less than the vehicle speed threshold V1 (at the timing c1). In other words, the vehicle traveling in the low vehicle speed range may decelerate with the braking operation being performed at the timing t1. This deceleration state prohibits the execution of the catalyst deterioration diagnosis. Once the execution of the catalyst deterioration diagnosis is prohibited, the fuel injection to the engine 13 may be halted at the timing t1 (corresponding to a timing d4), the engine traveling mode may be switched to the motor traveling mode to disconnect the engine 13 from the drive wheels 24, thereby stopping the engine 13 (at the timing e2).

Now described is a regenerative control of the motor generator 14 in the deceleration state in which the execution of the catalyst deterioration diagnosis is prohibited. With reference to FIG. 10A, during the traveling in the engine traveling mode, the motor generator 14 may be controlled to the power running state, the regenerative state, or the idling state, depending on the drive force required for the vehicle and the state of charge of the battery 78. Thereafter, the accelerating operation may be released, and the braking operation may be performed. The traveling state at this timing may correspond to the deceleration state in which the execution of the catalyst deterioration diagnosis is prohibited. Accordingly, as illustrated in FIG. 10B, the engine traveling mode may be switched to the motor traveling mode to disconnect the engine 13 from the drive wheels 24, thereby stopping the engine 13. Additionally, the regenerative torque of the motor generator 14 may be increased to a level at which a deceleration rate Gm3 associated with the regenerative torque reaches a target deceleration rate G2. The target deceleration rate G2 may be determined on the condition that the braking operation is performed. For example, as illustrated in FIG. 9, the regenerative torque of the motor generator 14 may be increased to a level at which the deceleration rate Gm3 associated with the regenerative torque reaches the target deceleration rate G2 of the vehicle.

CONCLUSION

In the foregoing example implementation of the technology, the execution of the catalyst deterioration diagnosis is prohibited when the vehicle traveling in the low vehicle speed range decelerates with the braking operation being performed. In contrast, the execution of the catalyst deterioration diagnosis is permitted when the vehicle traveling in the low vehicle speed range decelerates without the braking operation being performed. In other words, the execution of the catalyst deterioration diagnosis is prohibited when the deceleration rate upon deceleration of the vehicle traveling in the low vehicle speed range is increased by the braking operation. In contrast, the execution of the catalyst deterioration diagnosis is permitted when the deceleration rate upon deceleration of the vehicle traveling in the low vehicle speed range is reduced without the braking operation being performed. In this way, whether the catalyst deterioration diagnosis is to be executed is determined depending on the deceleration rate upon deceleration of the vehicle. Accordingly, it is possible to execute the catalyst deterioration diagnosis at an appropriate timing and further suppress an interruption of the catalyst deterioration diagnosis.

During the catalyst deterioration diagnosis, the air-fuel ratio is controlled to the lean side for a predetermined period of time. This requires that the engine traveling mode be maintained to keep the engine speed even while the vehicle is decelerating. If the vehicle decelerates at a high deceleration rate and stops in a short period of time in such a circumstance, it may possibly cause difficulty in keeping the engine speed while maintaining the fuel-cut condition, and in turn, difficulty in controlling the air-fuel ratio to the lean side. For example, with reference to FIG. 9, if the vehicle decelerates at a high deceleration rate, the vehicle may possibly be stopped at a timing to (corresponding to a timing c2) before the completion of the catalyst deterioration diagnosis (from the timing t1 to the timing t3). In other words, the deceleration of the vehicle at a high deceleration rate may possibly interrupt the catalyst deterioration diagnosis. To address such a concern, in an example implementation of technology, the execution of the catalyst deterioration diagnosis is preliminarily prohibited when the vehicle decelerates at a high deceleration rate. This avoids repeated execution of the catalyst deterioration diagnosis, reduces fuel injections associated with the catalyst deterioration diagnosis, and suppresses a decrease in regenerative electric power due to the maintenance of the engine traveling mode. Accordingly, it is possible to execute the catalyst deterioration diagnosis at an appropriate timing.

In the foregoing example implementations according to the technology, the execution of the catalyst deterioration diagnosis is permitted regardless of the braking operation during the traveling in the high vehicle speed range; however, example implementations of the technology should not be limited to the foregoing example implementations. In another example implementation according to the technology, the execution of the catalyst deterioration diagnosis may be prohibited also when the vehicle traveling in the high vehicle speed range decelerates with the braking operation being performed, i.e., when the deceleration rate upon deceleration of the vehicle traveling in the high vehicle speed range is increased by the braking operation. In other words, the execution of the catalyst deterioration diagnosis may be determined on the basis of the deceleration rate upon deceleration of the vehicle traveling at any speed within the entire vehicle speed range including the low vehicle speed range and the high vehicle speed range.

In the foregoing example implementations according to the technology, the deceleration rate upon deceleration of the vehicle may be determined to be high when the braking operation is performed, and the deceleration rate upon deceleration of the vehicle may be determined to be low when the braking operation is not performed; however, example implementations of the technology should not be limited to the foregoing example implementations. In another example implementation according to the technology, the deceleration rate upon deceleration of the vehicle may be determined to be high when a pressing amount of the brake pedal or a braking operation amount is greater than a predetermined threshold, and the deceleration rate upon deceleration of the vehicle may be determined to be low when the braking operation amount is less than the predetermined threshold. In still another implementation of the technology, the deceleration rate upon deceleration of the vehicle may be determined to be high when a pressing amount of the accelerator pedal or an accelerating operation amount is less than a predetermined threshold, and the deceleration rate upon deceleration of the vehicle may be determined to be low when the accelerating operation amount is greater than the predetermined threshold. In still another implementation of the technology, the deceleration rate upon deceleration of the vehicle may be determined to be high when the vehicle decelerates without the accelerating operation being performed. Additionally, the deceleration rate upon deceleration of the vehicle may be determined to be low when the vehicle decelerates with the accelerating operation being performed.

In the foregoing example implementations according to the technology, the deceleration rate upon deceleration of the vehicle may be determined on the basis of the braking operation; however, example implementations of the technology should not be limited to the foregoing example implementations. In another example implementation according to the technology, the deceleration rate upon deceleration of the vehicle may be determined to be high when an inter-vehicle distance from the own vehicle to a preceding vehicle is less than a predetermined threshold. Additionally, the deceleration rate upon deceleration of the vehicle may be determined to be low when the inter-vehicle distance from the own vehicle to a preceding vehicle is greater than the predetermined threshold. The inter-vehicle distance from the own vehicle to a preceding vehicle may be detected by the camera unit 76 or radar, for example. In still another example implementation of the technology, the execution of the catalyst deterioration diagnosis may be determined on the basis of the deceleration rate upon deceleration of the vehicle detected by the acceleration rate sensor 77, without estimating the deceleration rate upon deceleration of the vehicle on the basis of the braking operation.

Although some preferred implementations of the technology are described above by way of example with reference to the accompanying drawings, the technology is by no means limited to the implementations described above. It should be appreciated that modifications and alterations may be made by persons skilled in the art without departing from the scope as defined by the appended claims. For example, the vehicle to which the vehicle control apparatus 10 according to any example implementation of the technology is applied should not be limited to the hybrid vehicle 11 provided with the traveling motor, and may be a vehicle not provided with the traveling motor. Further, the vehicle to which the vehicle control apparatus 10 is applied should not be limited to the vehicle that causes, for example, the traveling motor of the starter generator 41 to operate upon the deceleration of the vehicle, and may be a vehicle that does not cause, for example, the starter generator 41, to operate upon the deceleration of the vehicle.

In the foregoing example implementations according to the technology, the catalyst deterioration diagnosis involves controlling the air-fuel ratio from the lean side to the rich side during the deceleration of the vehicle; however, example implementations of the technology should not be limited to the foregoing example implementations. In another example implementation of the technology, the air-fuel ratio may be controlled to the lean side even after the decelerating vehicle stops, and the air-fuel ratio may be controlled to the rich side at a timing when the engine 13 is started to complete the catalyst deterioration diagnosis. Further, in the foregoing example implementations according to the technology, the catalyst deterioration diagnosis is performed once between the activation and the termination of the control system of the vehicle; however, example implementations of the technology should not be limited to the foregoing example implementations. In another example implementation according to the technology, the catalyst deterioration diagnosis may be executed on a predetermined traveling distance basis or a predetermined time basis.

The engine controller 60 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the engine controller 60. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the engine controller 60 illustrated in FIG. 2.

It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:

1. A vehicle control apparatus for a vehicle equipped with an engine and a motor generator, the vehicle control apparatus including a traveling mode of the vehicle including (a) an engine traveling mode during which power is transmitted from the engine to a drive wheel of the vehicle and a regenerative torque of the motor generator is transmitted from the drive wheel of the vehicle to the motor generator during periods of deceleration of the vehicle, and (b) a motor traveling mode during which power is transmitted from the motor generator to the drive wheel of the vehicle, the vehicle control apparatus comprising:

a catalyst deterioration diagnosing unit configured to begin, while the vehicle decelerates in the engine traveling mode, execution of a deterioration diagnosis of a catalyst included in an exhaust system of the engine provided in the vehicle;

an engine controlling unit configured to control, during the execution of the deterioration diagnosis of the catalyst, an air-fuel ratio of the engine to a lean side by reducing an amount of fuel in the air-fuel ratio to be less than a predetermined threshold and thereafter control the air-fuel ratio to a rich side by increasing the amount of fuel in the air-fuel ratio to be more than the predetermined threshold;

a diagnosis start determining unit configured to:

prohibit the deterioration diagnosis of the catalyst from beginning based on determining that a deceleration rate of the vehicle exceeds a target deceleration rate during deceleration of the vehicle, and permit beginning the deterioration diagnosis of the catalyst based on determining that the deceleration rate of the vehicle is at or below the target deceleration rate during the deceleration of the vehicle; and a traveling mode switch configured to:

when the vehicle decelerates in the engine traveling mode and the deterioration diagnosis of the catalyst is prohibited from beginning, switch the traveling mode of the vehicle from the engine traveling mode to the motor traveling mode; and when the vehicle decelerates in the engine traveling mode and the deterioration diagnosis of the catalyst is permitted to begin, maintain the engine traveling mode; wherein, during the execution of the deterioration diagnosis:

the vehicle decelerates at or below the target deceleration rate or has already decelerated at or below the target deceleration rate to a complete stop and subsequently begins accelerating; and while the vehicle decelerates and the deterioration diagnosis of the vehicle is permitted to begin, a first deceleration rate associated with braking of the engine and a second deceleration rate associated with the regenerative torque of the motor generator are generated such that a sum of the first deceleration rate and the second deceleration rate is at or below the target deceleration rate.

2. The vehicle control apparatus according to claim 1, wherein the engine is disengaged from the drive wheel of the vehicle during the motor traveling mode.

3. The vehicle control apparatus according to claim 1, wherein, during the execution of the deterioration diagnosis, the air-fuel ratio is controlled to the lean side even after the decelerating vehicle comes to a complete stop and thereafter is controlled to the rich side from the lean side after the engine is restarted due to an acceleration of the vehicle.

4. The vehicle control apparatus according to claim 1, wherein, during the execution of the deterioration diagnosis while the vehicle is decelerating, the first deceleration rate associated with the braking of the engine and the second deceleration rate associated with the regenerative torque of the motor generator are dynamically adjusted to maintain the deceleration rate of the vehicle to be at or below the target deceleration rate, and wherein the first deceleration rate associated with the braking of the engine decreases while the second deceleration rate associated with the regenerative torque of the motor generator increases until the first deceleration rate becomes zero.

5. A vehicle control apparatus for a vehicle equipped with an engine and a motor generator, the vehicle control apparatus including a traveling mode of the vehicle including (a) an engine traveling mode during which power is transmitted from the engine to a drive wheel of the vehicle and a regenerative torque of the motor generator is transmitted from the drive wheel of the vehicle to the motor generator during periods of deceleration of the vehicle, and (b) a motor traveling mode during which power is transmitted from the motor generator to the drive wheel of the vehicle, the vehicle control apparatus comprising circuitry configured to:

determine whether a deceleration rate of the vehicle exceeds a target deceleration rate during deceleration of the vehicle;

when the deceleration rate of the vehicle exceeds the target deceleration rate during the deceleration of the vehicle, prohibit beginning a deterioration diagnosis of a catalyst included in an exhaust system of the engine provided in the vehicle;

when the deceleration rate of the vehicle is at or below the target deceleration rate during the deceleration of the vehicle, permit beginning the deterioration diagnosis of the catalyst included in the exhaust system of the engine provided in the vehicle;

control, during execution of the deterioration diagnosis of the catalyst, an air-fuel ratio of the engine to a lean side by reducing an amount of fuel in the air-fuel ratio to be less than a predetermined threshold and thereafter control the air fuel ratio to a rich side by increasing the amount of fuel in the air-fuel ratio to be more than the predetermined threshold;

when the vehicle decelerates in the engine traveling mode and the deterioration diagnosis of the catalyst is prohibited from beginning, switch the traveling mode of the vehicle from the engine traveling mode to the motor traveling mode; and when the vehicle decelerates in the engine traveling mode and the deterioration diagnosis of the catalyst is permitted to begin, maintain the engine traveling mode;

wherein, during the execution of the deterioration diagnosis:

the vehicle decelerates at or below the target deceleration rate or has already decelerated at or below the target deceleration rate to a complete stop and subsequently begins accelerating; and while the vehicle decelerates and the deterioration diagnosis of the vehicle is permitted to begin, a first deceleration rate associated with braking of the engine and a second deceleration rate associated with the regenerative torque of the motor generator are generated such that a sum of the first deceleration rate and the second deceleration rate is at or below the target deceleration rate.

6. The vehicle control apparatus according to claim 5, wherein the engine is disengaged from the drive wheel of the vehicle during the motor traveling mode.

7. The vehicle control apparatus according to claim 5, wherein, during the execution of the deterioration diagnosis, the air-fuel ratio is controlled to the lean side even after the decelerating vehicle comes to a complete stop and thereafter is controlled to the rich side from the lean side after the engine is restarted due to an acceleration of the vehicle.

8. The vehicle control apparatus according to claim 5, wherein, during the execution of the deterioration diagnosis while the vehicle is decelerating, the first deceleration rate associated with the braking of the engine and the second deceleration rate associated with the regenerative torque of the motor generator are dynamically adjusted to maintain the deceleration rate of the vehicle to be at or below the target deceleration rate, and wherein the first deceleration rate associated with the braking of the engine decreases while the second deceleration rate associated with the regenerative torque of the motor generator increases until the first deceleration rate becomes zero.

* * * * *